SEQUENTIAL PRESENTATION SYSTEM

Filed Aug. 5, 1957 4 Sheets-Sheet 1

INVENTORS
HANS HEUER and
HUGO REICHERT
BY [signature]
PATENT AGENT

April 26, 1960 H. HEUER ET AL 2,934,749

SEQUENTIAL PRESENTATION SYSTEM

Filed Aug. 5, 1957 4 Sheets-Sheet 2

INVENTORS
HANS HEUER and
HUGO REICHERT
BY
PATENT AGENT

April 26, 1960 H. HEUER ET AL 2,934,749

SEQUENTIAL PRESENTATION SYSTEM

Filed Aug. 5, 1957 4 Sheets-Sheet 3

INVENTORS
HANS HEUER and
HUGO REICHERT

BY [signature]

PATENT AGENT

| Display | 7 | 1 | 3 | 2 | 8 | 4 | 3 | 1 | 9 | 5 | 2 | 6 | 0 | 4 | 3 | 5 | 7 | 8 | 1 | 6 |
|---|---|---|---|---|---|---|---|---|---|---|---|---|---|---|---|---|---|---|---|---|
| Decade | I | II | III | IV | V | VI | VII | VIII | IX | X | XI | XII | XIII | XIV | XV | XVI | XVII | XVIII | XIX | XX |
| a | $A_1$ | | | | | | | | | $A_{10}$ | | | | | | $A_{16}$ | $A_{17}$ | | | |
| b | $B_1$ | | $B_3$ | $B_4$ | $B_5$ | | $B_7$ | | $B_9$ | $B_{10}$ | $B_{11}$ | | $B_{13}$ | | $B_{15}$ | $B_{16}$ | $B_{17}$ | $B_{18}$ | | |
| c | $C_1$ | $C_2$ | $C_3$ | $C_4$ | $C_5$ | $C_6$ | $C_7$ | $C_8$ | $C_9$ | $C_{10}$ | $C_{11}$ | $C_{12}$ | $C_{13}$ | $C_{14}$ | $C_{15}$ | $C_{16}$ | $C_{17}$ | $C_{18}$ | $C_{19}$ | $C_{20}$ |
| d | $D_1$ | | | | | | | | | $D_{10}$ | | | | | | $D_{16}$ | $D_{17}$ | | | |
| e | $E_1$ | | $E_3$ | $E_4$ | $E_5$ | | $E_7$ | | $E_9$ | $E_{10}$ | $E_{11}$ | | $E_{13}$ | | $E_{15}$ | $E_{16}$ | $E_{17}$ | $E_{18}$ | | |
| f | | $F_2$ | | | | $F_6$ | | $F_8$ | | | | $F_{12}$ | | $F_{14}$ | | | | | $F_{19}$ | $F_{20}$ |
| g | | $G_2$ | | | | | | $G_8$ | | | | | | | | | | | $G_{19}$ | |
| h | $H_1$ | | $H_3$ | $H_4$ | $H_5$ | | $H_7$ | | $H_9$ | | $H_{11}$ | | $H_{13}$ | | $H_{15}$ | | $H_{17}$ | $H_{18}$ | | |
| i | | $I_2$ | | | $I_5$ | $I_6$ | | $I_8$ | $I_9$ | $I_{10}$ | | $I_{12}$ | $I_{13}$ | $I_{14}$ | | $I_{16}$ | | $I_{18}$ | $I_{19}$ | $I_{20}$ |
| j | | | | | | | | | | $J_{10}$ | | | | | | $J_{16}$ | | | | |
| k | | $K_2$ | | | | | | $K_8$ | | $K_{10}$ | | | | | | $K_{16}$ | | | $K_{19}$ | |
| l | $L_1$ | | $L_3$ | $L_4$ | $L_5$ | | $L_7$ | | $L_9$ | | $L_{11}$ | | $L_{13}$ | | $L_{15}$ | | $L_{17}$ | $L_{18}$ | | |
| m | | | | | | $M_6$ | | | | | | $M_{12}$ | $M_{13}$ | $M_{14}$ | | | | | | $M_{20}$ |
| n | | | | | $N_5$ | | | | $N_9$ | | | $N_{12}$ | | | | | | $N_{18}$ | | $N_{20}$ |
| o | O | $O_2$ | $O_3$ | $O_4$ | $O_5$ | $O_6$ | $O_7$ | $O_8$ | $O_9$ | | $O_{11}$ | $O_{12}$ | | $O_{14}$ | $O_{15}$ | | $O_{17}$ | $O_{18}$ | $O_{19}$ | $O_{20}$ |
| p | | | | | | | | | $P_9$ | $P_{10}$ | | | $P_{13}$ | | | $P_{16}$ | | | | |
| q | | | | | $Q_5$ | $Q_6$ | | | | | | $Q_{12}$ | $Q_{13}$ | $Q_{14}$ | | | | $Q_{18}$ | | $Q_{20}$ |
| r | $R_1$ | | | $R_4$ | | $R_6$ | | | | | $R_{11}$ | | | $R_{14}$ | | | $R_{17}$ | | | |
| s | | $S_2$ | | | | $S_6$ | | $S_8$ | | | | | | $S_{14}$ | | | | | $S_{19}$ | |
| t | | | $T_3$ | | $T_5$ | $T_6$ | $T_7$ | | $T_9$ | $T_{10}$ | | $T_{12}$ | $T_{13}$ | $T_{14}$ | $T_{15}$ | $T_{16}$ | | $T_{18}$ | | $T_{20}$ |
| u | $U_1$ | | $U_3$ | $U_4$ | $U_5$ | | $U_7$ | | $U_9$ | $U_{10}$ | $U_{11}$ | $U_{12}$ | $U_{13}$ | | $U_{15}$ | $U_{16}$ | $U_{17}$ | $U_{18}$ | | $U_{20}$ |
| v | | | | | | | | | | | | | | | | | | | | |
| w | | $W_2$ | | | | $W_6$ | | $W_8$ | | | | | | $W_{14}$ | | | | | $W_{19}$ | |
| x | | | $X_3$ | | $X_5$ | | $X_7$ | | $X_9$ | $X_{10}$ | | $X_{12}$ | $X_{13}$ | | $X_{15}$ | $X_{16}$ | | $X_{18}$ | | $X_{20}$ |
| y | $Y_1$ | | | $Y_4$ | | | | | | | $Y_{11}$ | | | | | | $Y_{17}$ | | | |
| z | | $Z_2$ | $Z_3$ | $Z_4$ | $Z_5$ | | $Z_7$ | $Z_8$ | $Z_9$ | $Z_{10}$ | $Z_{11}$ | $Z_{12}$ | $Z_{13}$ | | $Z_{15}$ | $Z_{16}$ | | $Z_{18}$ | $Z_{19}$ | $Z_{20}$ |
| y' | | $Y'_2$ | $Y'_3$ | $Y'_4$ | $Y'_5$ | $Y'_6$ | $Y'_7$ | $Y'_8$ | $Y'_9$ | $Y'_{10}$ | $Y'_{11}$ | $Y'_{12}$ | $Y'_{13}$ | $Y'_{14}$ | $Y'_{15}$ | $Y'_{16}$ | | $Y'_{18}$ | $Y'_{19}$ | $Y'_{20}$ |
| z' | | $Z'_2$ | | $Z'_4$ | | | | $Z'_8$ | | | $Z'_{11}$ | | | | | | | | $Z'_{19}$ | |

Fig. 5

INVENTORS
HANS HEUER and
HUGO REICHERT

BY [signature]

PATENT AGENT

United States Patent Office 2,934,749
Patented Apr. 26, 1960

2,934,749

SEQUENTIAL PRESENTATION SYSTEM

Hans Heuer and Hugo Reichert, Wilhelmshaven, Germany, assignors to Olympia Werke A.G., Wilhelmshaven, Germany Application August 5, 1957, Serial No. 676,313
Claims priority, application Germany August 16, 1956
5 Claims. (Cl. 340—174)

The present invention relates to switching means for sequential indicating or printing devices for use with computing machines or the like, in which the printing or indicating is carried out in successive steps by means of electrically controlled patterns.

Electronically controlled matrix presentation devices heretofore known operate to present all of the digits at the same time whereby, for example, the electronically computed series of numbers have all their digits simultaneously printed. An extremely large number of switching elements, such as diodes, is required for this purpose. For example, in a printing mechanism of 20 digits, 65 times 20, or 1300, diodes are necessary for the control of the printing mechanism to present the digits 0 to 9. In case of the application of a decoder, an additional 40 diodes for each of the digits will be necessary, so that the total number will be 2,100 diodes.

In certain cases, the well known system of sequential printing is used, whereby the values calculated at one time and converted by a distributor into actuating voltages for matrix presentation are consecutively and electromechanically fed to the individual presentation mechanisms of the individual digits or, else, a printing mechanism capable of printing one digit at a time is advanced from digit to digit. In this manner, the number of diodes can be decreased to 65+40=105. In this case, the presentation speed is dependent upon the inertia of the electromagnetic switching means. The printing speed would be decreased to less than 0.5 line per second, as compared with the simultaneous printing mechanism of 50 lines per second.

It is an object of the present invention to provide an electronic switching device for sequential printing mechanisms in which, by means of a relatively small number of electronic switching means, a high printing speed of at least 2 lines per second is obtained, which can be considered as satisfactory in many cases.

It is another object of the invention to provide a network of AND circuits cooperating with a distributor and with a ring counter acting as a column selector, said network being adapted to advance the actuating voltages corresponding with the selection of output distributor in accordance with any given symbol or number introduced into the distributor, by switching these voltages to that digit printing matrix which is determined by the instantaneous position of the ring counter selector.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

Figure 1 shows schematically a distributor circuit of a known type, adapted to distribute an input voltage at one of the inputs 0 to 9 to certain selected operating conduits *a* to *z'* connected to the various printing elements which make up a matrix.

Figure 2 shows schematically a pattern of matrix elements having 4 times 7 separate elements *a* to *z'*, which can be actuated in various combinations to display a digit or letter, e.g., the number 5.

Figure 5 is a chart showing a succession of actuator voltage combinations acting upon the matrix elements to present digits which are consecutively printed in a 20 digit printing mechanism employing the numbers 0 to 9.

Figure 1:
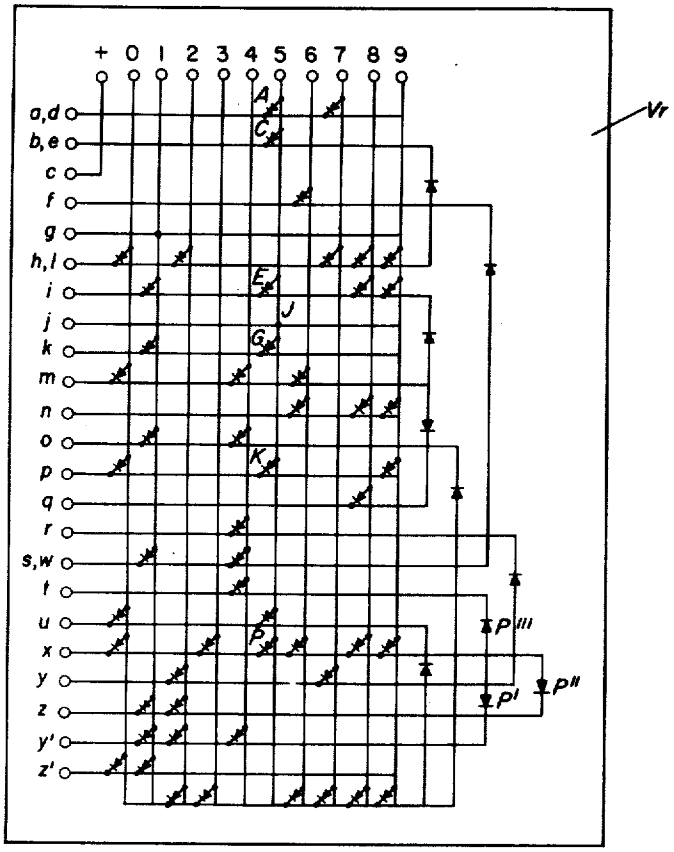

Referring now more particularly to Figure 1, actuating conductors *a* to *z'* of a distributor V*r* assigned to a printing mechanism are adapted to be energized in a known manner when one of the numbers 0 to 9 is selected via electric valves A, C, E, etc., or via direct connectors, for example, J. In case of introduction of the digit 5 which, for example, may be assumed to have been selected by an electronic computing mechanism, the operating lines *a, b, c, d, e, i, j, k, p, t, u, x, z* and *y'* are connected to voltages. While in case of simultaneous printing mechanisms a separate distributor would be assigned to each of the digit matrixes, the outputs *a* to *z'* of such distributor being connected directly to the individual elements of a matrix of the type shown in Figure 2, or to the actuating members of the same, in the sequential printing mechanism according to the invention, the same distributor is switched to the printing mechanism of succeeding matrixes corresponding with each digit to be presented. For example, the number 5 introduced into the distributor is printed in the first digit, and the next number, for example, 7, is subsequently presented by the next adjacent matrix mechanism when connected to the distributor.

This kind of operation requires sequential electronic switching of the succeeding outputs of the distributor to successive adjacent matrixes if the printing speed is to be appreciably increased, as compared with purely mechanical computing machines.

Figure 3:
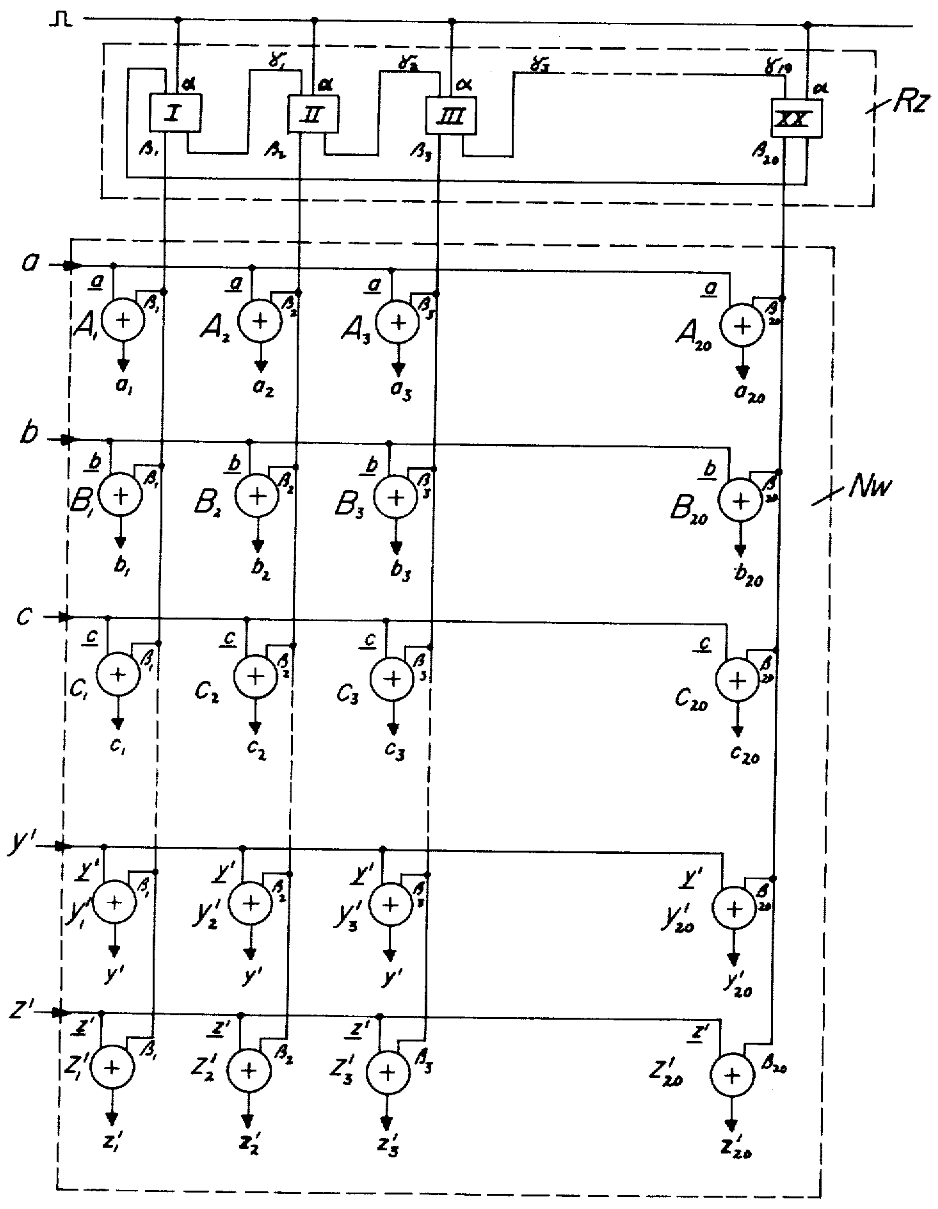
Figure 3 is a partial circuit diagram by means of which actuating voltages can be applied consecutively to the individual digit printing matrixes by a network of AND circuits, said actuating voltages appearing according to Figure 1 at certain outputs *a* to *z'* and changing according to the sequence of digits.

In the block diagram of Figure 3, showing an electronic switching system, a printing mechanism for 20 digits is provided, wherein the outputs *a* to *z'* of a distributor V*r* are connected to the inputs *a* to *z'* of the respective columns of actuators, for example, $A_1$ to $A_{20}$, $B_1$ to $B_{20}$, etc., of AND circuits known per se. It is evident that no action takes place in the system of the AND circuits when only the output voltages of the distributor V*r* occur at the inputs, *a*, *b*, etc. of the AND circuits. When the ring counter column selector comprising individual flip-flop means I to XX delivers an output voltage from the flip-flop I to the inputs $\beta_1$ of the AND circuits $A_1$ to $Z_1'$ of the first column, all of those AND circuits in the first column are rendered active and responsive to these inputs *a*, *b*, etc., to which a distributor voltage is simultaneously applied. Consequently, these AND circuits deliver operating voltages to correspondingly selected printing elements of the matrix printing mechanism of the first digit and, thereby, cause printing of the number which was introduced into the distributor.

When the next digit is entered, a switching pulse is simultaneously applied to all of the inputs $\alpha$ of the flip-flops of the ring counter. This pulse renders the flip-flop II of the second digit AND column via the connection $\gamma_1$ active, said flip-flop being previously conditioned in a known manner. Simultaneously, the flip-flop I of the first decade is returned to the non-active condition in a manner likewise known per se. As a result of this, the voltage at $\beta_1$ is switched off and all of the AND circuits of the first column become inactive. At the same time, a voltage from the flip-flop II appears at $\beta_2$ and causes all of the AND circuits of the second column, where there is also applied a distributor voltage according to the newly introduced digit, to become active and cause presentation in the second digit.

When further numbers are introduced, the printing operation takes place in successive digits until, upon the printing of the 20th digit via the line $\gamma_{20}$, the flip-flop I is again conditioned and made ready to begin the printing of a new line.

Figure 2:
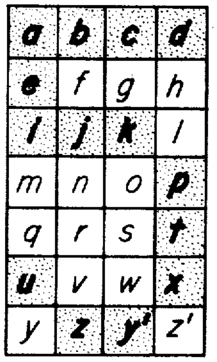
Figure 4:
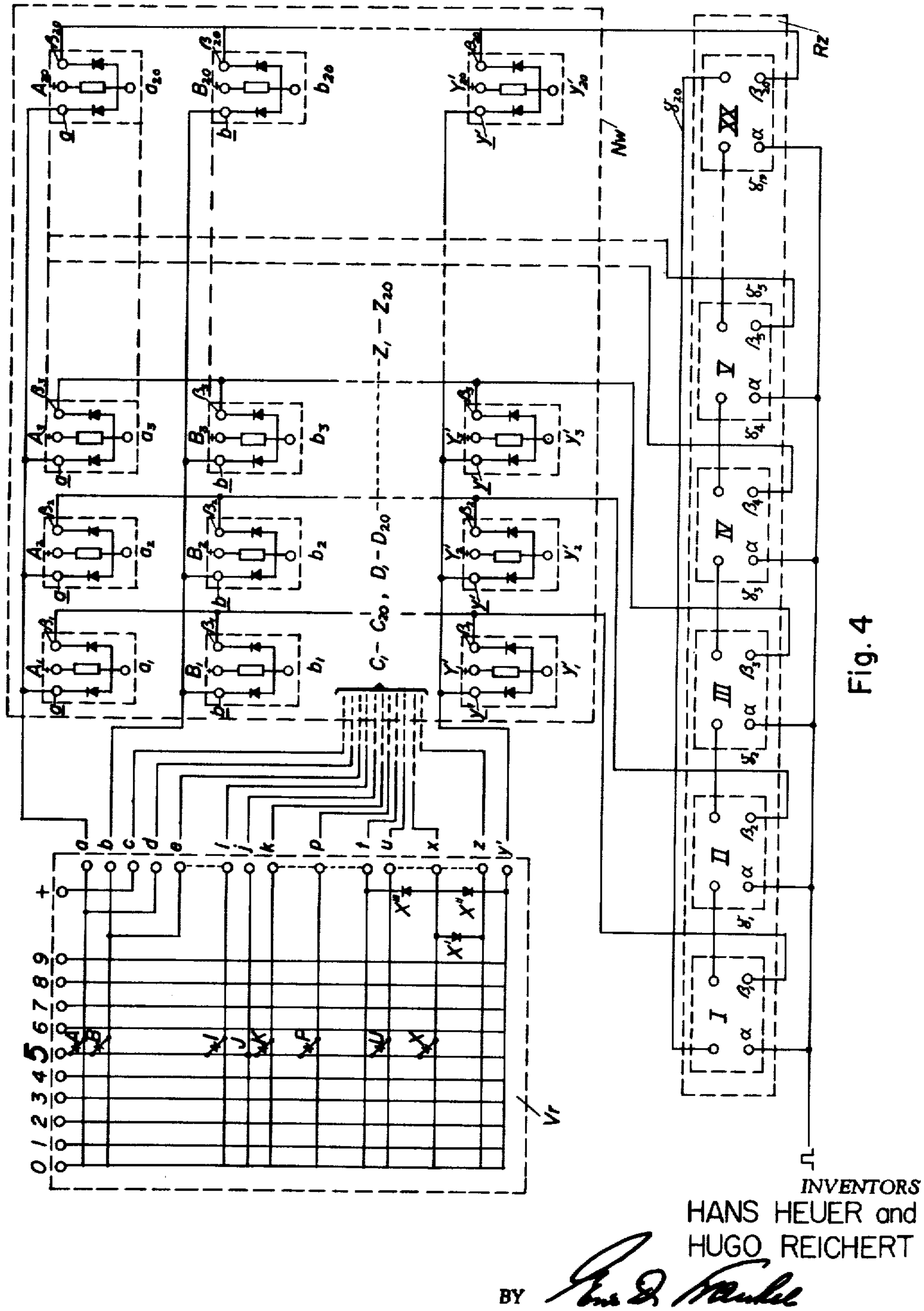
Figure 4 is a circuit diagram in which a distributor is connected to AND circuits $A_1$ to $A_{20}$, $B_1$ to $B_{20}$ . . . $Z'_1$ to $Z'_{20}$ and to the ring counter matrix column selector comprising flip-flop means I to XX.

The operation of the new system will be explained more in detail with reference to Figure 4. This figure shows how the diodes A, B, I, K, P, U, X, X', X'', X''' become active when the number 5 is introduced into the distributor, and in addition to this, how the direct connection J between the vertical input wire 5 and the horizontally operating wires *a, b, c, d, e, i, j, k, p, t, u, x, z* and *y'* are rendered active. Since these outputs of the distributor are respectively connected to the inputs with the same reference characters of the associated AND circuits, i.e., *a* to $A_1$ to $A_{20}$, *b* to $B_1$ to $B_{20}$, etc., the actuating potentials *a, b* etc. of these AND circuits are raised. Assuming that, simultaneously with the introduction of the number 5 into the distributor, a pulse delivered from the computing mechanism and transmitted to all of the inputs of the flip-flop I to XX and thereby the ring counter is initially switched in such a manner, that a voltage appears at the output $\beta_1$ of the first flip-flop, said voltage being active at all of the inputs $\beta_1$ of the AND circuits of the first column. According to the principle of the AND circuits known per se, an operating voltage will appear at the outputs of those of the AND circuits to which, in addition to the distributor voltage, a flip-flop voltage is applied. In the present case, this condition is present at the outputs $a_1$, $b_1$, $c_1$, $d_1$, $e_1$, $i_1$, $j_1$, $k_1$, $p_1$, $t_1$, $u_1$, $x_1$, $z_1$ and $y_1'$, partially omitted in Figure 4, of the respecttive AND circuits. The printing of the number 5 takes place in this digit because these output voltages are supplied to the matrix printing elements of the first digit, as indicated in Figure 2, by heavy print and shading in the matrix elements.

If, subsequently, the number 7 is to be printed in the second digit, this number 7 is introduced by the computing mechanism into the distributor *Vr* and causes, according to the distributor diagram of Figure 1, an increase in voltage at the inputs of the respective AND circuits. The ring counter energizes the flip-flop II in place of the flip-flop I when acted upon by a second pulse $\alpha$ generated simultaneously with the new number introduced, whereby an output voltage is connected to the inputs $\beta_2$ of the second vertical column of AND circuits. In this case, circuits thereby rendered active will furnish actuating voltages to the outputs $a_2$, $b_2$, $c_2$, $d_2$, $e_2$, $h_2$, $l_2$, $o_2$, $r_2$, $u_2$, and $y_2$ corresponding with the number 7 and, thus, cause printing of the number 7 in the second digit.

Therefore, the advance of the printing from one digit to the next is solely dependent upon the succession of the ring counter, the output voltages $\beta_1$ to $\beta_{20}$, each of which is consecutively transmitted to a vertical column of the AND circuits assigned thereto, whenever a pulse $\alpha$ appears.

The chart of Figure 5 shows which of the AND circuits becomes active during the course of a successive digit printing of a 20 digit line.

The operation of the ring counter used in this system corresponds to the widely known systems using high vacuum tubes, thyratrons or transistors, wherein the potentials of the entire circuit have to be matched to these elements. It is also possible to modify the system by using different kinds of AND circuits.

The system shown and described permits sequential printing of a 20 digit number with the use of only $65+40+2\times21\times20=945$ diodes and a 20 digit ring counter with 40 high vacuum tubes or transistors or 20 thyratrons.

Obviously, it is possible to write words by using patterned letters by means of sequential printing mechanisms designed according to the same principle. In such case, as with a digit printing mechanism, it may be suitable to carry out the printing step in a manner known per se by direct current transmission from the printing elements to the writing surface, for example, by physical or chemical changes.

We claim:

1. A sequential presentation system for use in presenting series of characters one at a time on each of a series of sequentially actuated matrixes each comprising a plurality of separate character-presenting elements individually responsive to an actuating voltage, and the combination of a plurality of said voltages actuating corresponding elements simultaneously representing a particular character, said system comprising a distributor for forming a plurality of voltages to be applied to the elements of a matrix to form one of said combinations in response to the introduction of a character into the distributor; a series of matrix-element actuators, each actuator corresponding with and connected to a different matrix element and receiving one of said voltages from the distributor corresponding with one element of a character combination; and sequential martix selecting means connected to energize the series of actuators associated with that matrix and said selecting means being operated by the distributor each time a new character is introduced to advance the energization to the next series of actuators corresponding with the elements of the sequentially next matrix to apply thereto the combination of voltages representing said new character.

2. In a system as set forth in claim 1, said selecting means comprising a ring counter having selecting members each corresponding with one series of actuators, and said actuators comprising a network of and circuits each associated with one possible voltage of the combination of voltages formed by said distributor, and each connected with one member of the ring counter to receive a conditioning signal energizing the actuator when the corresponding series of actuators is energized by the associated selecting member of the ring counter.

3. In a system as set forth in claim 2, the series of actuators corresponding with each matrix being arranged in adjacent columns, and the similar actuators of the various series which all correspond with similarly located elements of the various matrixes being arranged in adjacent rows, and the actuators in the rows all simultaneously receiving the same respective voltages from the distributor.

4. In a system as set forth in claim 3, one ring counter selecting member corresponding with each column, and said conditioning signals being applied to said actuators one column at a time.

5. In a system as set forth in claim 2, each actuator transmitting a voltage to its associated matrix element in response to a voltage received from the distributor only when the actuator is simultaneously receiving a conditioning signal from said selecting means.

References Cited in the file of this patent

UNITED STATES PATENTS

| | | |
|---|---|---|
| 2,594,731 | Connolly | Apr. 29, 1952 |
| 2,622,141 | Oberman | Dec. 16, 1952 |